United States Patent
Chen et al.

(10) Patent No.: US 9,314,885 B2
(45) Date of Patent: Apr. 19, 2016

(54) SHAPE MEMORY ALLOY COMPOSITE FLEXIBLE SUBSTRATES

(75) Inventors: Sung-Wei Chen, Las Vegas, NV (US); Christopher J. Rothfuss, Laramie, WY (US)

(73) Assignee: Empire Technology Development LLC, Wilmington, DE (US)

( * ) Notice: Subject to any disclaimer, the term of this patent is extended or adjusted under 35 U.S.C. 154(b) by 681 days.

(21) Appl. No.: 13/578,518

(22) PCT Filed: May 11, 2012

(86) PCT No.: PCT/US2012/037508
§ 371 (c)(1), (2), (4) Date: Aug. 10, 2012

(87) PCT Pub. No.: WO2013/169263
PCT Pub. Date: Nov. 14, 2013

(65) Prior Publication Data
US 2013/0298548 A1    Nov. 14, 2013

(51) Int. Cl.
*B29C 70/68* (2006.01)
*B29C 70/70* (2006.01)
(Continued)

(52) U.S. Cl.
CPC ............... *B23P 11/00* (2013.01); *B29C 61/06* (2013.01); *B29C 61/0608* (2013.01); *B29C 70/08* (2013.01); *B29C 70/688* (2013.01); *B29C 70/82* (2013.01); *G09F 9/301* (2013.01); *C08L 2201/12* (2013.01); *C21D 2201/01* (2013.01); *Y10T 29/49826* (2015.01)

(58) Field of Classification Search
CPC .................. B29K 2067/003; B29K 2867/003; B29C 70/08; B29C 70/687; B29C 70/688; B29C 70/82; B29C 70/84; B29C 70/543; B29C 70/00; B29C 70/02; B29C 70/04; B29C 61/06; B29C 61/0608; B29C 61/0658; G09F 9/301; F03G 7/065
See application file for complete search history.

(56) References Cited

U.S. PATENT DOCUMENTS 5,135,786 A * 8/1992 Hayashi et al. ............... 428/35.5
5,227,237 A * 7/1993 Saruyama et al. ............ 428/367
(Continued)

FOREIGN PATENT DOCUMENTS

AU    2003242038 A1    12/2003
DE    3322598 A1 * 12/1984 ............... B29D 3/02
(Continued)

OTHER PUBLICATIONS

Jonnalagadda et al., Local Displacements and Load Transfer in Shape Memory Alloy Composites, Experimental Mechanics (Mar. 1997), 37(1):78-86.*
(Continued)

*Primary Examiner* — Thomas Denion
*Assistant Examiner* — Xiaoting Hu
(74) *Attorney, Agent, or Firm* — Pepper Hamilton LLP

(57) ABSTRACT

A programmable shape device is described. The device comprises a wire grid made from a shape memory material. The grid is embedded in a transparent polymer. Under normal conditions, the device can be folded into any shape. Upon actuation, the device reverts back to a programmed parent shape. Such a device can be made into one shape during its desired use and another shape during storage or transportation. Methods of making and using a programmable shape device are described.

18 Claims, 7 Drawing Sheets

(51) Int. Cl.
  *B29C 61/06* (2006.01)
  *B23P 11/00* (2006.01)
  *B29C 70/08* (2006.01)
  *G09F 9/30* (2006.01)
  *B29C 70/82* (2006.01)
  *G06F 9/30* (2006.01)

(56) References Cited

U.S. PATENT DOCUMENTS

| | | | |
|---|---|---|---|
| 7,665,300 | B2 | 2/2010 | Biggs et al. |
| 7,858,891 | B2* | 12/2010 | Strohband et al. |
| 2004/0197519 | A1* | 10/2004 | Elzey et al. ............ 428/68 |
| 2005/0079779 | A1* | 4/2005 | McLeod et al. ............ 442/6 |
| 2006/0099418 | A1* | 5/2006 | Xu et al. ............ 428/375 |
| 2006/0201149 | A1 | 9/2006 | Biggs et al. |
| 2007/0202296 | A1* | 8/2007 | Chandrasekaran et al. .. 428/124 |
| 2008/0024963 | A1* | 1/2008 | Weksler et al. ............ 361/681 |
| 2009/0277169 | A1* | 11/2009 | Usoro et al. ............ 60/527 |
| 2011/0021097 | A1 | 1/2011 | Mather et al. |
| 2012/0168009 | A1* | 7/2012 | Chen et al. ............ 137/560 |
| 2013/0127690 | A1* | 5/2013 | Tsai ............ 345/55 |
| 2013/0258565 | A1* | 10/2013 | Nishi ............ 361/679.01 |

FOREIGN PATENT DOCUMENTS

| | | |
|---|---|---|
| DE | 102008032002 | 3/2010 |
| EP | 1516936 A1 | 3/2005 |
| JP | 2004012155 A | 1/2004 |
| JP | 4168151 B2 | 10/2008 |
| WO | WO03102256 A1 | 12/2003 |

OTHER PUBLICATIONS

International Search Report and Written Opinion for PCT/US2012/037508 dated Jun. 14, 2012.
Introduction to Shape Memory Alloys, http://www.google.com/url?sa=t&rct=j&q=&esrc=s&source=web&ed=1&ved=0CC0QjAA&url=http%3A%2F%2Fwww.tinialloy.com%2Fpdf%2Fintroductiontosma.pdf&ei=sb4mT4KoJoiFsgKgjvWMAg&usg=AFQjCNF2fg2Qh55UyH2s1wvCSBhL__vhN0A&sig2=Hw022N2mJPN__inwm6LukSg [Printed from Internet Jun. 14, 2012].
Shape Memory Alloy Actuators, http://www.autosplice.com/Product/?id=10043 [Printed from Internet Jul. 29, 2012].
Script OHIO Nitinol, shape memory alloy, retrieved from URL: http://www.youtube.com/watch?v=e2f29Sw7UVe, on Jan. 8, 2015, uploaded on May 15, 2010, p. 1-2.

* cited by examiner

SHAPE MEMORY ALLOY COMPOSITE FLEXIBLE SUBSTRATES

CROSS-REFERENCE TO RELATED APPLICATIONS

This application is a U.S. national stage filing under 35 U.S.C. §371 of International Application No. PCT/US2012/037508, filed on May 11, 2012 and entitled "Shape Memory Alloy Composite Flexible Substrate," the disclosure of which is incorporated by reference in its entirety.

BACKGROUND

Shape memory materials are materials that have the ability to transition from a deformed shape to an original (programmed or parent) shape when an appropriate external stimulus is provided. Typically, shape memory materials are metallic alloys or polymers, although other materials may also exhibit such properties. Many shape memory materials undergo the transition as a result of a change in temperature; however, other shape memory materials undergo a state transition in the presence of a magnetic field (ferromagnetic shape memory alloys), light, electricity, or chemical stimuli.

Shape memory alloys (SMAs) can undergo a phase change between two phases that have different mechanical properties. The two phases are commonly referred to as the martensitic and austenitic phases based on the Martensite and Austenite phases of Nitinol, which is the most widely used shape memory alloy. Nitinol is an alloy of nickel and titanium that has the ability to return to a predetermined shape when heated. The martensitic state is typically ductile and deformable. In contrast, the austenitic state is typically rigid and has a higher elastic modulus.

An important characteristic of SMAs is the transformation temperature at which phase transition of the SMA from martensitic phase to austenitic phase occurs. If the SMA is heated above the transformation temperature, it converts to the austenitic phase, where it can be programmed or trained into a parent shape. After the parent shape is programmed, the SMA is cooled back into the martensitic phase, where it can be deformed as a ductile material. If the SMA is subsequently heated above the transformation temperature, it will convert back to the austenitic phase and revert to the parent shape. This property of reverting back to the parent shape regardless of whether the alloy was deformed at the lower temperature, is the reason for the name "shape memory". The SMA, when not in the parent shape, is referred to as being in its non-actuated shape or passive shape.

SUMMARY

In an embodiment, devices with programmable shape may include at least one transparent polymer, at least one microscopic structure made from a first shape memory material, and at least one element for controlling a temperature of the first shape memory material.

In an embodiment, methods of manufacturing a programmable shape device may include assembling a grid of wires wherein each wire has a diameter of about 50 µm or less and comprises a shape memory material, cooling the grid below the transition temperature of the material, bending the grid into a parent shape, heating the grid above the transition temperature of the material to affix the parent shape, and embedding the grid in a transparent polymer.

In an embodiment, methods of using a programmable shape device may include programming the device into a parent shape, wherein the device comprises a transparent polymer, a microscopic structure made from a shape memory material, and an element for heating the shape memory material; and using the device as a transparent display when in the parent shape.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The present disclosure describes transparent composites made with a transparent polymer and a shape memory alloy. The transparent composite may be used, for example, to form electronic structures that may be malleable when inactive and rigid when activated with current in order to enable ease of transport. Other uses will be apparent to those of ordinary skill in the art based on the teachings of this disclosure.

Nitinol, an exemplary SMA, is formed by melting nickel (Ni) and titanium (Ti) together under strictly controlled conditions. As the alloy is cooled, Nitinol has an interpenetrating primitive cubic crystal structure, referred to as the austenitic phase (or the parent phase). As it is cooled further, Nitinol spontaneously transforms to a monoclinic crystal structure—martensitic phase. At an atomic level, the monoclinic structure of the martensitic phase has the ability to undergo limited deformation under stress without breaking atomic bonds by rearranging the atomic planes. Because of this, it is able to withstand up to about 8% strain. When a deformed Nitinol structure in the martensitic phase is heated above the transformation temperature, the original, rigid austenitic crystal structure is restored regardless of how deformed the structure was in the martensitic phase.

Nitinol, being an ordered intermetallic alloy, has specific positions for its constituent atoms in its crystal structure. Because of this, it is capable of generating large forces while transforming from the martensitic phase to the austenitic phase. For the same reason, small changes in the nickel (Ni) to titanium (Ti) ratio can change the transition temperature of the alloy significantly. Typically, Nitinol is composed of approximately 50-51% nickel (Ni) by atomic percent. But one can vary the ratio to configure the transition temperature of the alloy in the range of about −20° C. to about 60° C.

Figure 1:
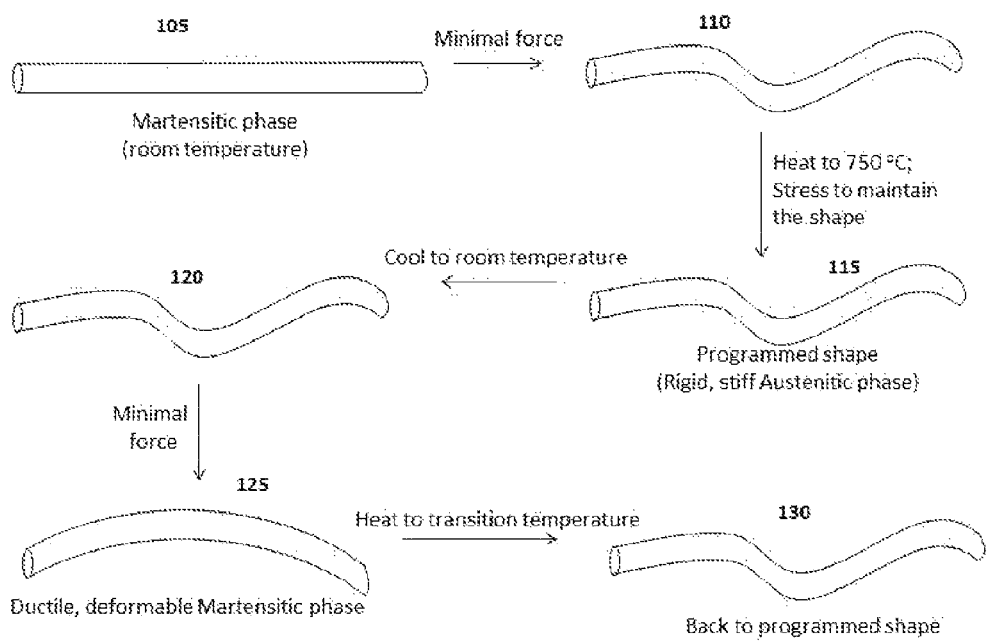
FIG. 1 depicts exemplary states of a wire comprising a shape memory material as the wire is programmed, cooled, molded and transitioned according to an embodiment.

FIG. 1 depicts exemplary states of a wire comprising a shape memory material as the wire is programmed, cooled, molded and transitioned according to an embodiment. As shown in FIG. 1, the shape memory material may be provided in a first form 105 in a martensitic phase at room temperature. The shape memory material may be bent into a desired shape 110 and heated to a transformation temperature that is substantially higher than a transition temperature while applying stress to maintain the shape 115. In particular, the shape memory material may be heated to a temperature that converts the shape memory material into the austenitic phase 115. As the material converts to the austenitic phase 115, the shape is "programmed" or "trained" into the shape memory material. The shape memory material may then be converted back to the martensitic phase 120 by allowing the material to cool to room temperature (or some other temperature below the transition temperature). While in the Martensitic phase, the shape memory material can again be bent into any shape 125. If heated again above a transition temperature, the shape memory material will revert to its "trained" or "programmed" shape 130.

Typically, a shape memory alloy is shaped during formation while it is cooling. The alloy will "remember" the shape even after cooling all the way to the martensitic phase and will revert back to that shape when reheated. This parent (or programmed or trained) shape may be changed by applying stress while in the austenitic phase to "re-train" or "re-program" the alloy as depicted in FIG. 1. Thus, by shaping the alloy at a temperature below the transformation temperature while in its martensitic phase 110 and heating the alloy to a temperature well above the transformation temperature under stress to maintain that shape one can induce a "new" parent shape 115. Afterwards, if the alloy is cooled back to martensitic phase 120, it can again be deformed as a ductile material 125. When heated above transformation temperature, it will revert back to the new parent shape 130.

Figure 2:
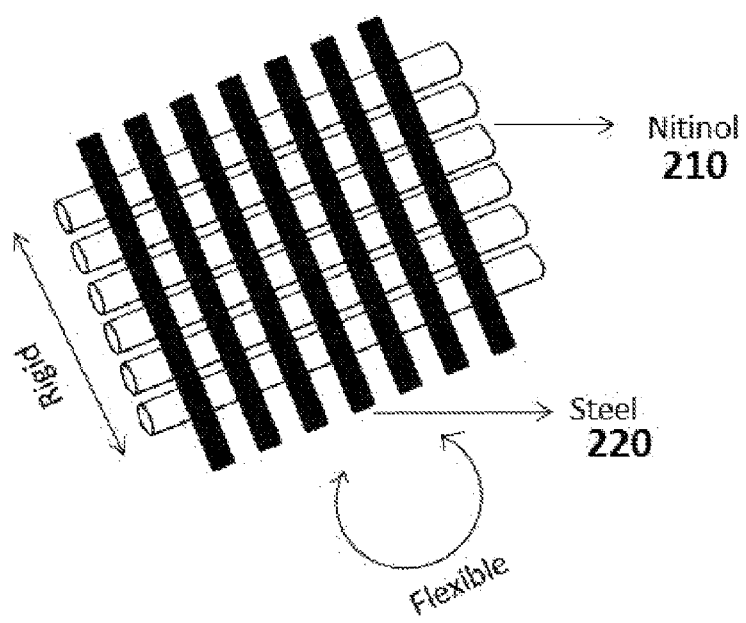
FIG. 2 depicts an illustrative grid made from a combination of wires of a shape memory alloy and a non-shape memory material according to an embodiment.

FIG. 2 depicts an illustrative grid made from a combination of wires of a shape memory alloy (Nitinol) 210 and a non-shape memory material (steel) 220 according to an embodiment. The Nitinol wires 210 are trained to be straight above a transition temperature which may be higher than room temperature such as, for example, 45° C. At room temperature the Nitinol wires 210 are flexible and can be bent into circles with minimal force, while the rigid steel wires 220 resist any bending and remain straight. As such the grid can be rolled into a cylinder along the axis of the steel wires 220 and remain rigid in the orthogonal direction. When the grid is heated, while in its rolled state, to a temperature above the transition temperature of Nitinol, for example, to a temperature of 60° C. by placing it in an oven, the Nitinol wires 210 switch to their rigid, trained shape and the grid reverts to a flat sheet.

Figure 3A:
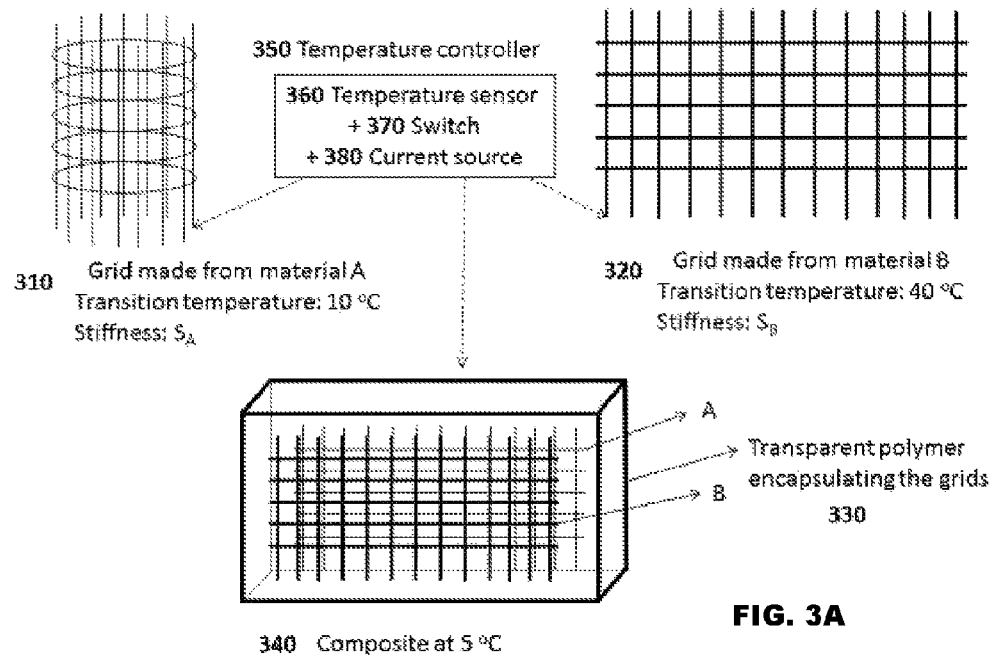
FIG. 3 depicts an illustrative composite made from a combination of wire grids of two different shape memory alloys having different transition temperature and mechanical properties according to an embodiment.
Figure 3B:
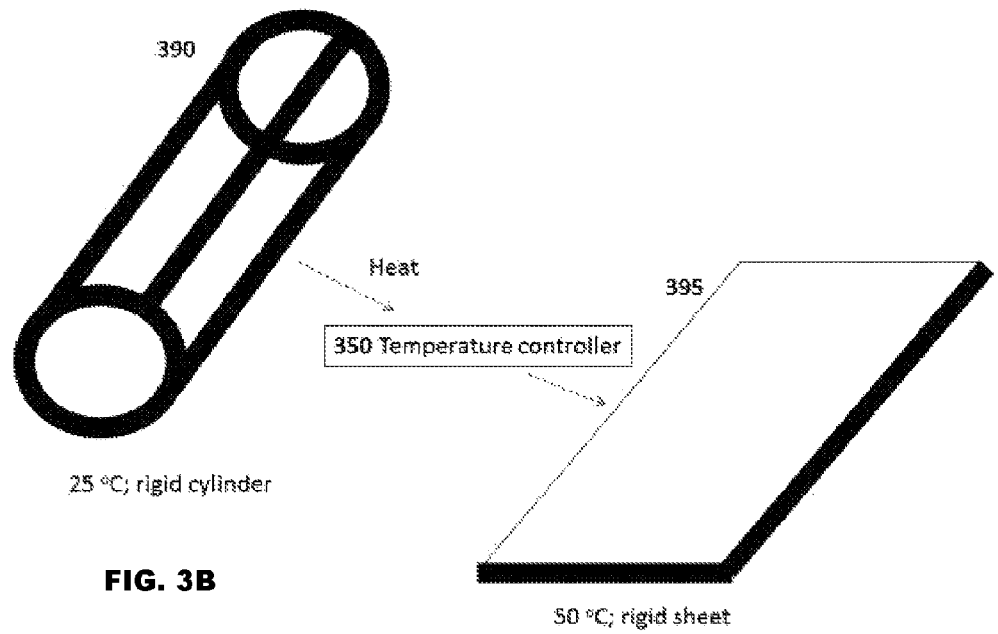

FIG. 3 depicts an illustrative composite including two different shape memory materials according to an embodiment. According to one embodiment, shown in FIG. 3A, the composite 340 is made from a combination of two wire grids of two different shape memory alloys: (i) a wire grid of material A 310, for example, having a transition temperature of 10° C. and a stiffness $S_A$, programmed into a parent shape of a cylinder, and (ii) a wire grid of material B 320, for example, having a transition temperature of 40° C. and a stiffness $S_B$ which is greater than $S_A$, programmed into a parent shape of a flat sheet. The two grids 310 and 320 are encapsulated in a transparent polymer 330 to form the composite programmable device 340. When the composite is at a temperature that is lower than the transition temperature of both material A and material B such as, for example, 5° C., it can be folded as desired. Such a device 340 may be heated using a temperature controller 350. A typical temperature controller may include, for example, a temperature sensor 360, a switch 370, and a current source 380. The current source may be, for example, a battery, a capacitor, or any other electronic device capable of providing a current output. The device 340 may be, in some circumstances, heated to an intermediate temperature that is higher than the transition temperature of material A but lower than the transition temperature of material B such as, for example, 25° C. At this temperature, material A is rigid, but material B is flexible. The device 340, therefore, assumes the programmed shape 390 of material A, as shown in FIG. 3B. At a temperature such as, for example 50° C., both material A and material B assume their programmed shapes. But material B has a stiffness $S_B$ that is higher than the stiffness $S_A$ of material A, forcing the device to assume the programmed shape 395 of material B.

In an embodiment, a device with programmable shape such as, for example, depicted in FIG. 3A, may include at least one transparent polymer 330, at least one microscopic structure made from a first shape memory material 310, and at least one element for controlling the temperature of the shape memory material 350.

One exemplary embodiment for a programmable shape device may be a transparent flexible display 340 with a microscopic structure comprising a wire grid of a shape memory alloy 320 embedded within a thin sheet of transparent polymer 330. The wire grid may be actuated by heating the grid. The grid may be heated by passing an electric current through the grid using a current source 380. In an embodiment, the current passing through the grid may be actively controlled to maintain the grid at a specific temperature using, for example, a temperature sensor 360 and a switch 370.

A programmable shape device will need to have a flexible substrate. Polymeric materials with near-zero crystallinity are generally transparent as well as flexible. This makes such good candidates for applications where transparency is desired in addition to flexibility. In some embodiments, the transparent polymer 330 may be, for example, polyethylene terephthalate (PET), polydimethyl siloxane (PDMS), and the like, or any combination thereof.

In some embodiments, the shape memory material may be a shape memory alloy 320. In certain embodiments, the shape memory alloy may include, for example, Nitinol, Cu—Al—Ni, Cu—Zn—Al, Fe—Mn—Si, Ag—Cd, Au—Cd, Cu—Sn, Fe—Pt, Co—Ni—Al, Co—Ni—Ga, Ni—Fe—Ga, Ti—Pd, or any combination thereof. It will be understood by one skilled in the art that specific mechanical and physical properties of various alloys will depend on the specific composition of the alloys including, but not limited to, specific elements present in the alloy and the ratios of those elements within the composition. One skilled in the art will also know that certain mechanical and physical properties including, but not limited to, transition temperature, melting temperature, tensile strength, elongation fraction, and Poisson's ratio may be determined and varied by adjusting the ratio of various component elements within the particular alloy.

In some embodiments, the shape memory material may be a shape memory polymer (SMP). In particular embodiments, the shape memory polymer may include, but is not limited to, PET, polyethylene oxide, polystyrene, poly(1,4-butadiene), polytetrahydrofuran, and the like, or any combinations thereof. SMPs, like shape memory alloys, have the ability to return from a deformed (non-actuated or passive) shape to their original (programmed or actuated) shape. The mechanisms underlying the shape memory effect in polymers are different from those in alloys, where the basis of the effect is difference in crystal structures of the deformed and programmed states. In case of SMPs, phase transition from an amorphous to a glassy state causes the shape-memory effect. SMPs have the ability to "remember" two or sometimes three shapes and can be actuated by electric or magnetic fields, light, or chemical milieu in addition to heat.

One application for a programmable shape device is as a flexible transparent protective coating for a set of devices embedded in a flexible substrate. Such a set of devices can be folded into any desired shape (for example, as in 390) while, for example, being transported or stored, and may need to be made rigid while in use (as in 395).

A programmable shape device that appears transparent may be made by embedding a structure made from the shape memory material in a flexible, transparent substrate such as mentioned above. The structure made from the shape memory material may be imperceptible to a human eye. As such, the device to appears to be transparent. The maximum resolution of the human eye is about 0.03 mm (30 µm), but most human beings are unable to discern objects smaller than about 0.05 mm (50 µm). So, for all practical purposes, wires with diameters less than about 50 µm will be imperceptible to a human eye, especially if they are spaced at least about 50 µm apart. In some embodiments, the microscopic structure may be imperceptible to the naked eye. In other embodiments, the microscopic structure comprises a microscopic mesh grid of wires of the shape memory material embedded in a thin polymer sheet. In certain embodiments, the wires of the mesh grid may have a diameter of about 50 µm or less. In other embodiments, the wires of the mesh grid may be separated by a distance of about 50 µm or more.

Some SMPs may be transparent. A structure made from such transparent SMPs and embedded in other transparent polymers may be used for making the transparent programmable shape device. In some embodiments, the microscopic structure made from the shape memory material may be transparent.

In some embodiments, the microscopic structure may comprise microscopic wires of the shape memory material randomly embedded in a polymer matrix. In certain embodiments, the microscopic wires may have a diameter of about 50 µm or less. In order for the structure to be imperceptible to human eye, the wires may be dispersed such that the average distance between the randomly embedded wires is at least about 50 µm.

In some embodiments, the transparent polymer in which the shape memory material is embedded may be about 1 mm thick.

A microscopic wire grid of flexible wires embedded within a thin polymer sheet may enable for the polymer to be folded into a desired shape when not in use, for example, rolled into a cylinder or bent into a U-shape. In some situations, it may be desirable to have two definite shapes for the device (as depicted in FIG. 3B). For example, the device could be in a first shape 395 for desired usage and in a second shape 390, distinct from the first, for transportation and storage. It may also be desired, in some situations, for both the first and the second shape to be rigid. For example, the device may need to be rolled into a cylinder 395 along a specific axis to be stored inside a tube of a specific length. Various shapes can be obtained from a wire grid by modifying the grid composition by adding or replacing the SMA or SMP wires of the grid with wires of non-shape memory materials (as depicted in FIG. 2, 220), or shape memory materials with properties different from each other.

In some embodiments, the device may additionally comprise a microscopic structure made from a non-shape memory material 220. In certain embodiments, the non-shape memory material may be steel, or other rigid metallic material with high elastic modulus. In specific embodiments, a microscopic structure of a rigid non-shape memory material may be designed to provide a specific parent shape to the device. In other embodiments, a microscopic structure of a rigid non-shape memory material may be designed to provide a specific non-actuated or passive shape to the device.

In some embodiments, the device may further comprise microscopic structures of two different shape memory materials, wherein the two materials have different transition temperatures. In certain embodiments, the two materials may have different elastic moduli. An example of such an embodiment is illustrated in FIG. 3. In some embodiments, the two materials (A and B) may have different transition temperatures and different elastic moduli. In certain embodiments, the two materials may have substantially the same transition temperature but different elastic moduli. In other embodiments, the two materials may have a substantially same elastic modulus but different transition temperatures. In yet other embodiments, the device may comprise microscopic structures of more than two shape memory materials, wherein the transition temperatures and elastic moduli of the different shape memory materials may be different or substantially the same in various combinations thereof. In specific embodiments, the various microscopic structures of various shape memory materials may be designed to provide multiple temperature dependent parent shapes to the device.

Figure 7A:
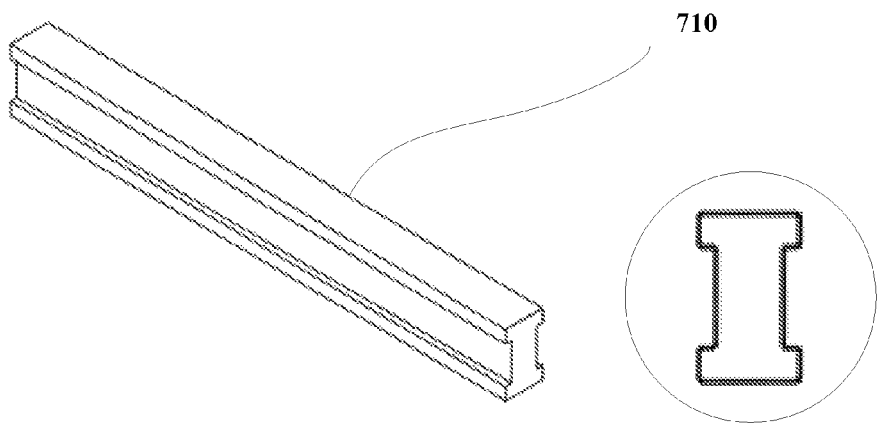
FIGS. 7A and 7B depict cross-sectional views of wires with non-cylindrical geometries such as I-shaped, T-shaped to vary the stiffness of the microscopic structure.
Figure 7B:
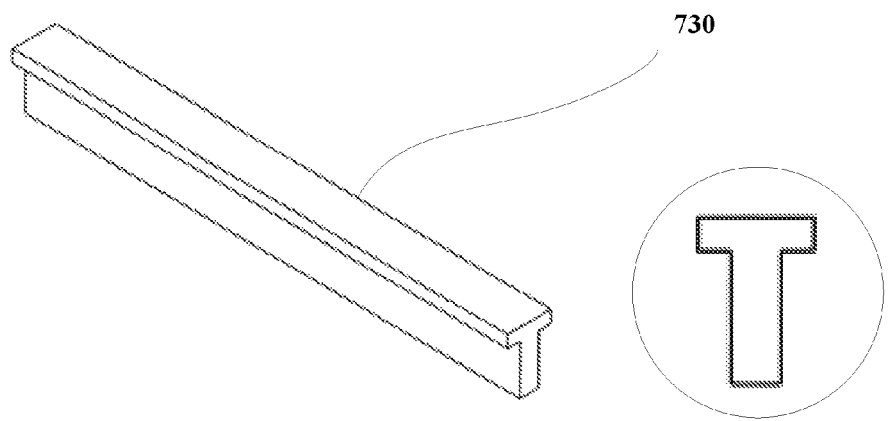

In some situations, it may be necessary to increase the stiffness of the device. It may be desirable, in some situations, that the stiffness of the device be direction-dependent and vary based on the axis of bending. Certain wire geometries increase the effective modulus of a wire. For instance, a wire with an I-shaped cross-section may be stiffer than a wire with a circular cross-section. In some embodiments, the various microscopic structures described herein above may be made from wires with non-cylindrical geometries such as, for example, I-shaped 710 (FIG. 7A), T-shaped 730 (FIG. 7B) and so forth, to vary the stiffness of the microscopic structure.

Most shape memory alloys including, for example, Nitinol, are temperature responsive; ductile and flexible at lower temperatures, and stiff and rigid at higher temperatures. The programmable shape device as described herein above, may be activated by heating the microscopic structure of the shape memory material embedded in the device. Depending on the particular application, the shape memory material may be heated in a number of ways including, but not limited to, immersing the device in hot water, blowing hot air on the device, contacting the device with a hot surface, exposing the device to infra-red radiation, passing an electric current through the structure, and so forth. In some situations, it may be desirable for the device to be stiff and rigid at room temperature. In such cases, it may be desirable to cool the device in order to de-program the device and make it ductile and flexible, for example, during storage or transportation. Cooling may be achieved, for example, by simply placing the device in a refrigerated environment, immersing the device in cold water, blowing cold air on the device, contacting the device with a cold surface, adding a peltier cooling element to the device, and so forth.

In some embodiments, the shape memory material may be a temperature responsive shape memory material. In some embodiments (as in FIG. 3A), the element for controlling the temperature (350) of the shape memory material may be a heating element or a cooling element. In certain embodiments, the heating element may comprise an element for passing electric current (380) through the microscopic structure. In specific embodiments, the heating element may optionally include a control element such as, for example, a temperature sensor (360) configured to monitor the heating of the shape memory material and a switch (370) for turning the current on and off as required to maintain the temperature. In yet other embodiments, the heating element may include a capacitive bank for passing large current through the shape memory material in a short period of time.

In some embodiments, the shape memory material may be a ferromagnetic shape memory material configured to switch to a parent shape in the presence of a magnetic field.

Figure 4:
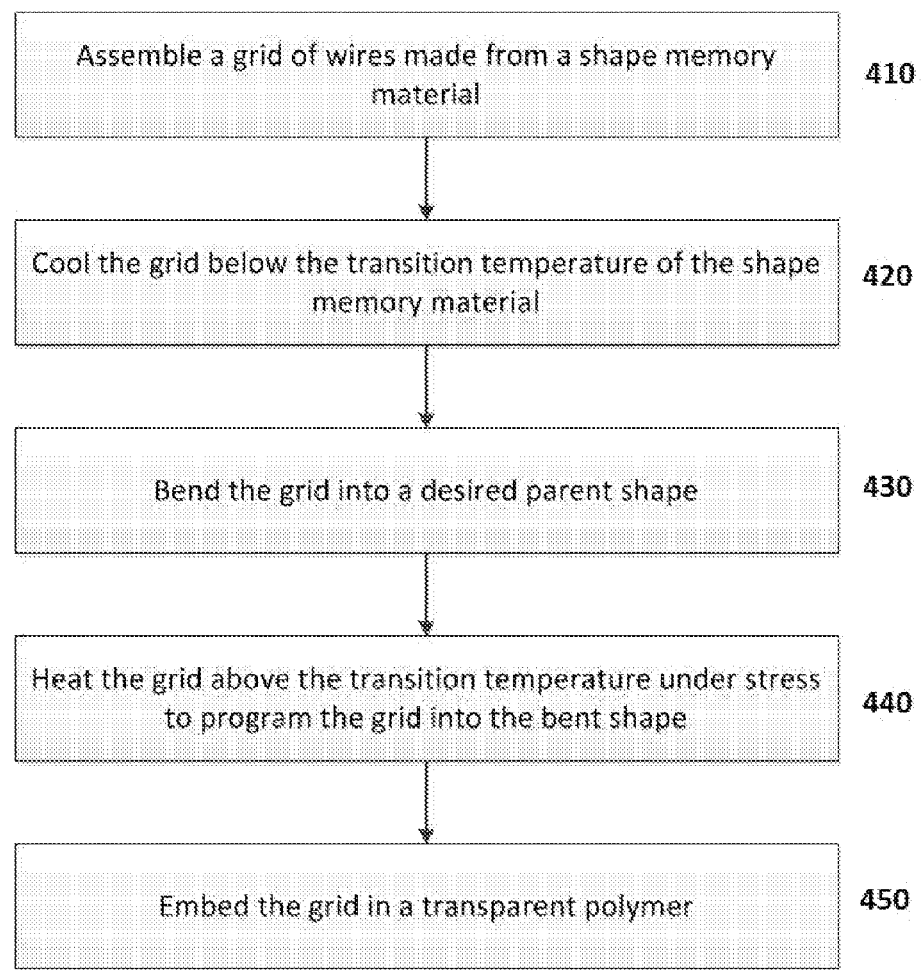
FIG. 4 depicts a flow diagram for a method of manufacturing a programmable shape device according to an embodiment.
Figure 6A:
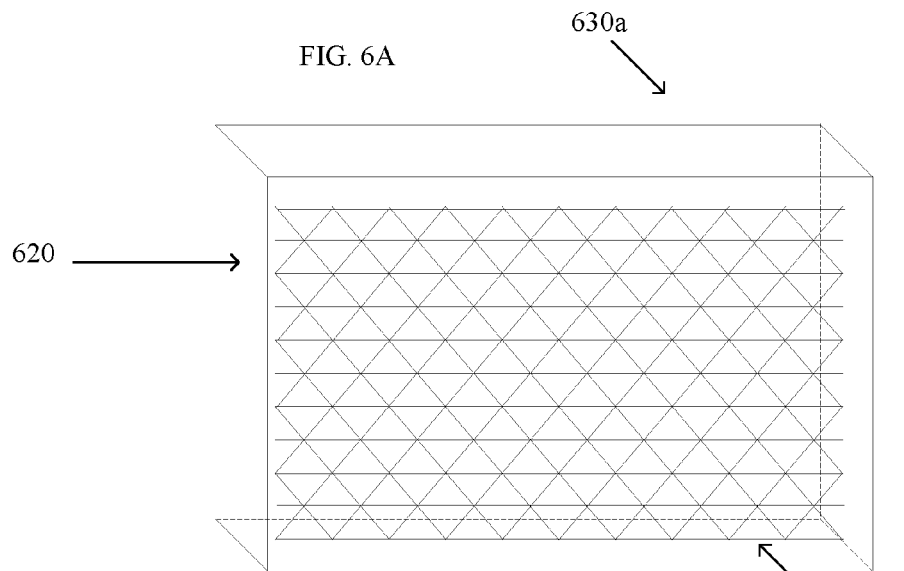
FIGS. 6A and 6B depict additional embodiments of a composite made from wire grids comprising a shape memory alloy according to an embodiment.
Figure 6B:
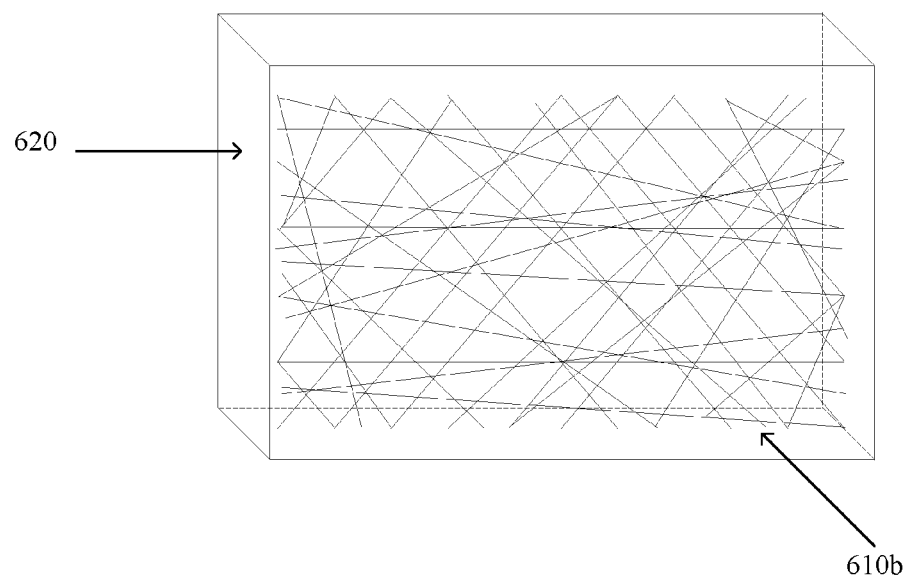

FIG. 4 depicts a flow diagram for an illustrative method of making a transparent programmable shape device. A grid of wires of a shape memory material may be assembled 410. In an embodiment, the grid may be assembled 410 as a wire-mesh with a square grid. In an alternate embodiment, the grid may be assembled 410 as a triangular wire-mesh 610a (FIG. 6A) embedded in the transparent polymer matrix 620 (FIG. 6A) to form the composite 630a (FIG. 6A). In yet other embodiments, the grid may be assembled 410 in the form of any regular polygon. In some embodiments, the grid may be assembled 410 such that the wires are aligned randomly 610b (FIG. 6B) and embedded in the transparent polymer matrix 620 (FIG. 6B) to form the composite 630b (FIG. 6B).

The grid may be cooled 420 below the transition temperature of the shape memory material. In an embodiment, the grid may be cooled 420 below the transition temperature by contacting the grid with a cold surface. Other examples of ways to cool 420 the grid may include, but are not limited to, blowing cold air over the grid, placing the grid in a refrigerated environment, immersing the grid in cold water, immersing the grid in, for example, liquid nitrogen, attaching the grid to a peltier cooler, and the like.

The grid may be bent 430 into a parent shape. In an embodiment, the grid may be bent 430 into a parent shape by placing the grid over a mold and applying requisite force. In other embodiments, the grid may be bent 430 into a parent shape by rolling the grid between two tangential cylinders. Examples of parent shapes for the grid may include, but are not limited to, a flat sheet, a cylinder, a U-shape, an L-shape, and the like.

The grid may be heated 440 above the transition temperature of the material to program or affix the parent shape. In an embodiment, the grid may be heated 440 by passing an electric current through the grid. Other examples of ways to heat 440 the grid may include, but are not limited to, immersing the device in hot water, blowing hot air on the device, contacting the device with a hot surface, exposing the device to infra-red radiation, passing an electric current through the structure, and the like.

The grid may be embedded 450 in a transparent polymer. In an embodiment, embedding 450 the grid in a transparent polymer may comprise molding the transparent polymer around the grid. In an embodiment, the transparent polymer may be injection-molded around the grid to embed 450 the grid in the transparent polymer.

In some embodiments, the method of manufacturing the programmable shape device may comprise assembling 410 the wires of the shape memory material and embedding 450 the aligned wires to the bulk of the transparent polymer matrix to form a composite before heating 440 the composite to mold the composite into a parent shape. In certain embodiments, the alignment of the wires of the shape memory material may be in the form of a wire grid and in other embodiments, the alignment may be random.

In an embodiment, a method of using a programmable shape device comprises programming the device into a parent shape, and using the device as a transparent display when the device is in its parent shape. The device may be programmed into one of a variety of parent shapes, including without limitation, a flat sheet, a cylinder, a U-shape or the like.

Figure 5:
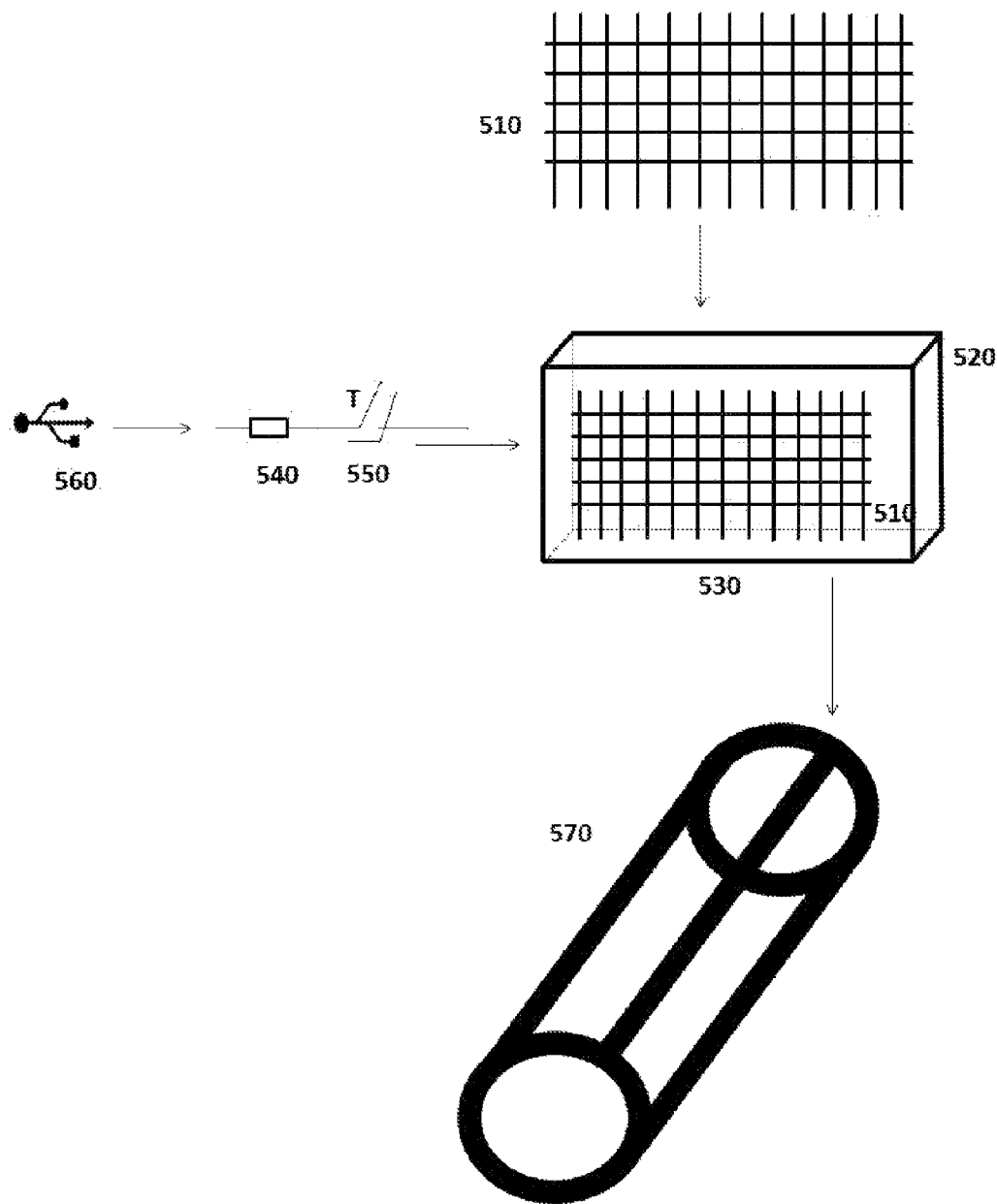
FIG. 5 depicts an illustrative composite made from a wire grid of a single shape material and having an electrically controlled heating element according to an embodiment.

In an embodiment, a transparent programmable shape display has an electronically controlled heating element as depicted in FIG. 5. The display 530 may be made by sandwiching a microscopic wire grid of Nitinol 510 between thin sheets of PET 520. The wire grid may be connected to a control element having a resistive element 540 and a temperature controlled switch 550. The resistive element may draw power from an electronic device 560 such as, for example, a keyboard via, for example, a USB connection. The temperature controlled switch 550 may be configured to disconnect the power to the resistive element 540 upon reaching a predefined temperature above the transition temperature of the Nitinol grid 510 and re-connect the power if the temperature of the Nitinol grid 510 drops to the transition temperature. Such a control element may be used to maintain the display 530 in its stiff, rigid state, without over-heating, as long as it is connected to the electronic device 560. When the display 530 is disconnected from the electronic device 560, the temperature of the grid drops below the transition temperature and the coating becomes ductile and flexible so that it may be bent into desired shape 570 for storage or transportation.

EXAMPLES

Example 1

Device Programmed to a Shape of a Rigid Sheet

A grid of Nitinol wires 510 (FIG. 5), with 50 μm diameter and 450 μm spacing between the wires is sandwiched between two layers of 0.5 mm thick PET 520 to make about 1 mm thick composite. Before being sandwiched between the PET sheets, the wire grid is trained to a flat sheet parent shape by heating to above 500° C. The transition of the Nitinol wires is chosen to be above room temperature, at about 40° C. Application of an electric current using an electric circuit, for example, as in a combination of 540, 550, and 560, to the grid 510 heats it to transform it to the rigid state. Thus, at room temperature or at any temperature below the transition temperature, the Nitinol is in the martensitic phase and elastic. At these temperatures, the composite is elastic and deformable, and can be folded or rolled into a cylinder 570. When heated above 40° C., the Nitinol transitions to the austenitic phase and becomes a rigid flat sheet 530.

For a 7 cm×7 cm square composite, heating the grid from about 25° C. to about 40° C. requires 19.8 mA at 1.5 V. For such heating requirements, even handheld, portable electronic devices such as smartphones, for example, via a USB connection 560, can be used for changing their shapes. In this case, the non-actuated shape of the device is variable.

Example 2

Device with Restricted Flexibility and Programmed to the Shape of a Rigid Sheet The structure can be made to have a fixed non-actuated shape by having a grid with Nitinol wires 210 (FIG. 2) only in one direction while the wires in the orthogonal direction are of a rigid material such a steel 220. The grid with such geometry will be a rigid flat sheet when heated above the transition temperature. In its non-actuated state below the transition temperature, the Nitinol wires are flexible and can be bent whereas, the steel wires remain rigid and cannot be bent. As such, the grid can be rolled along the axis of the steel wires into a flexible cylinder.

Example 3

Device with Two Distinct Programmed Shapes

In this example, two different grids are made of two different shape memory materials, A 310 (FIG. 3A) and B 320 chosen such that transition temperature of A is below the operating temperature (room temperature), for example, 10° C. and elastic modulus $S_A$ of A is smaller than the elastic modulus $S_B$ of B. B has a transition temperature above the operating temperature, for example, 40° C. Both the grids are embedded in the polymer sheet 330. The grid of A is trained to parent shape of a rigid cylinder 310, the grid of B is trained to be in a parent shape of a rigid flat sheet 320.

At room temperature, the composite 340 is above the transition temperature of A, but below the transition temperature of B. Under these conditions, the grid of A reverts to its parent rigid cylindrical shape while, the grid of B remain flexible. The composite takes the shape of A—a rigid cylinder 390.

When B is heated above its transition temperature, the grid of B reverts to its parent rigid sheet shape. Because B has a higher elastic modulus than A, the composite takes the shape of B—a rigid flat sheet 395.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

All ranges disclosed herein are inclusive and combinable. As used herein, the term "about" means plus or minus 10% of the numerical value of the number with which it is being used. Therefore, about 50% means in the range of 40% to 60%.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A device with a programmable shape, the device comprising:
   at least one transparent polymer;
   at least one structure comprising a first mesh grid of a plurality of wires made from a first shape memory material and one or more second mesh grids of a plurality of wires made from one or more second shape memory materials embedded in the at least one transparent polymer,
   wherein the first mesh grid made from the first shape memory material has a first temperature-programmed parent shape,
   wherein the first shape memory material has a first transition temperature,
   wherein each of the one or more second shape memory materials has a second transition temperature,
   wherein the first shape memory material and the one or more second shape memory materials are different materials,
   wherein the first transition temperature and the second transition temperature are different, and
   wherein each of the one or more second mesh grids made from the second shape memory materials has a second temperature-programmed parent shape different from the first temperature-programmed parent shape;
   at least one switch configured to control a passage of an electric current through the structure; and
   at least one temperature sensor.

2. The device of claim 1, wherein the transparent polymer is one of poly ethylene terephthalate (PET), or polydimethyl siloxane (PDMS).

3. The device of claim 1, wherein the first shape memory material is configured to switch between the first temperature-programmed parent shape and a second shape based on a change in temperature.

4. The device of claim 1, wherein the transparent polymer is a sheet having a thickness of about 0.5 mm to about 1 mm.

5. The device of claim 1, wherein each of the plurality of wires has a diameter of about 50 μm or less.

6. The device of claim 1, wherein plurality of wires of the first and second mesh grids are spaced apart and substantially parallel and a distance between each of the plurality of wires is about 50 μm or more.

7. The device of claim 1, wherein the plurality of wires of the first and second mesh grids are disposed randomly with respect to each other.

8. The device of claim 1, wherein the at least one structure further comprises a non-shape memory material.

9. The device of claim 1,
   wherein the first shape memory material has a first stiffness,
   wherein the at least one structure further comprises one or more second materials,
   wherein the first shape memory material and the one or more second materials are different materials,
   wherein the one or more second materials have at least one second stiffness, and
   wherein the first stiffness and the at least one second stiffness are different.

10. The device of claim 1,
    wherein each of the plurality of wires has an I-shaped cross-section or a T-shaped cross-section.

11. The device of claim 1, further comprising a source of the electric current.

12. The device of claim 11, wherein the source of the electric current comprises a capacitive bank.

13. The device of claim 1, wherein the first shape memory material comprises a ferromagnetic shape memory material.

14. A method of manufacturing a programmable shape device, the method comprising:
    assembling a first grid of wires disposed randomly with respect to each other
    wherein each wire has a diameter of about 50 μm or less and comprises a first shape memory material having a first transition temperature;
    assembling a second grid of wires disposed randomly with respect to each other
    wherein each wire has a diameter of about 50 μm or less and comprises a second shape memory material different from the first shape memory material and having a second transition temperature different from the first transition temperature;
    cooling the first and second grids below the respective transition temperatures of the materials,
    bending the first grid into a first parent shape;
    bending the second grid into a second parent shape different from the first parent shape;
    heating the first and second grids above the respective transition temperatures of the materials to affix the parent shapes; and
    embedding the first and second grids in a transparent polymer.

15. The method of claim 14, wherein embedding the grids comprises molding the transparent polymer around the grids.

16. The method of claim 14, wherein embedding the grids comprises injection molding the transparent polymer around the grids.

17. The method of claim 14, wherein one of the first and second parent shapes is a cylinder.

18. The method of claim 14, wherein one of the first and second parent shapes is a U-shape.

* * * * *